US012646720B2

(12) United States Patent
Zhang et al.

(10) Patent No.: US 12,646,720 B2
(45) Date of Patent: Jun. 2, 2026

(54) COVALENT ORGANIC FRAMEWORK AND ITS ELECTROCHEMICAL USE

(71) Applicant: City University of Hong Kong, Kowloon (HK)

(72) Inventors: Qichun Zhang, Kowloon (HK); Chun-Sing Lee, Kowloon (HK); Chenchen Wang, Kowloon (HK); Shen Xu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 636 days.

(21) Appl. No.: 18/155,852

(22) Filed: Jan. 18, 2023

(65) Prior Publication Data

US 2024/0079591 A1 Mar. 7, 2024

Related U.S. Application Data

(63) Continuation-in-part of application No. 17/888,935, filed on Aug. 16, 2022, now abandoned.

(51) Int. Cl.

| | |
|---|---|
| ***H01M 4/60*** | (2006.01) |
| ***H01M 4/02*** | (2006.01) |
| ***H01M 10/0525*** | (2010.01) |
| ***H01M 10/054*** | (2010.01) |
| ***H01M 50/109*** | (2021.01) |

(52) U.S. Cl.

CPC ......... *H01M 4/60* (2013.01); *H01M 10/0525* (2013.01); *H01M 10/054* (2013.01); *H01M 50/109* (2021.01); *H01M 2004/027* (2013.01)

(58) Field of Classification Search

CPC .. H01M 4/60; H01M 10/0525; H01M 10/054; H01M 50/109; H01M 2004/027; H01M 4/137; Y02E 60/10

See application file for complete search history.

(56) References Cited

U.S. PATENT DOCUMENTS

| | | | |
|---|---|---|---|
| 10,644,308 | B2 | 5/2020 | Liu |
| 11,289,703 | B2 | 3/2022 | Yamauchi |

(Continued)

FOREIGN PATENT DOCUMENTS

| | | | |
|---|---|---|---|
| CN | 107221640 | A | 9/2017 |
| CN | 107123809 | B | 8/2019 |

(Continued)

OTHER PUBLICATIONS

Sattwick Haldar, Mingchao Wang, Preeti Bhauriyal, Arpan Hazra, Arafat H. Khan, Volodymyr Bon, Mark A. Isaacs, Ankita De, Leonid Shupletsov, Porous Dithiine-Linked Covalent Organic Framework as a Dynamic Platform for Covalent Polysulfide Anchoring in Lithium-Sulfur Battery Cathodes, 44 (20), 9101-9112 (Year: 2022).*

(Continued)

*Primary Examiner* — Nicholas A Smith
*Assistant Examiner* — Seamus Patrick Mcnulty
(74) *Attorney, Agent, or Firm* — Renner, Kenner, Greive, Bobak, Taylor & Weber

(57) ABSTRACT

An electrode material for an energy storage device including a covalent organic framework includes a plurality of aromatic moieties each linked by at least one thioether linkage. An anode including said electrode material, and an energy storage device having said anode.

13 Claims, 18 Drawing Sheets

BHT
+
THBQ X = F, Cl
BHT-BQ-COF

(56) References Cited

U.S. PATENT DOCUMENTS

2015/0132640 A1 5/2015 Balaya
2015/0147619 A1 5/2015 Chae

FOREIGN PATENT DOCUMENTS

CN 113054184 A 6/2021
IN 202231031780 A 8/2022

OTHER PUBLICATIONS

Hao Wang Chang-Jiang Yao, Recent progress in carbonyl-based organic polymers as promising electrode materials for lithium-ion batteries (LIBs), J. Mater. Chem. A,,8, 11906-11922 (Year: 2020).*
Tetsuya Kambe, Ryota Sakamoto, Ken Hoshiko, Kenji Takada, Mariko Miyachi, Ji-Heun Ryu, Sono Sasaki, Jungeun Kim, Kazuo Nakazato, Masaki Takata, and Hiroshi Nishihara;Π-Conjugated Nickel Bis(dithiolene) Complex Nanosheet Journal of the American Chemical Society 2013 135 (7), 2462-2465 (Year: 2013).*
Jian Xie, Zilong Wang, Peiyang Gu, Yi Zhao, Zhichuan J. Xu, Qichun Zhang. A novel quinone-based polymer electrode for high performance lithium-ion batteries, Sci China Mater, 59(1): 6-11 (Year: 2016).*
Haldar Supplemental (Year: 2022).*
H. Zhang, Y. Gao, X.-H. Liu, Z. Yang, X.-X. He, L. Li, Y. Qiao, W.-H. Chen, R.-H. Zeng, Y. Wang, S.-L. Chou, Organic Cathode Materials for Sodium-Ion Batteries: From Fundamental Research to Potential Commercial Application. Adv. Funct. Mater (Year: 2022).*
Deng, et al., "Sodium-ion batteries: from academic research to practical commercialization", Advanced Energy Materials, 2018, 8, 1701428.
Wang, et al., "All organic sodium-ion batteries with Na4C8H2O6", Angewandte Chemie International Edition, 2014, 53, 5892-5896.
Li, et al., "Long-lifespan polyanionic organic cathodes for highly efficient organic sodium-ion batteries", ChemSusChem, 2020, 13, 1991-1996.
Deng, et al., "A Low cost, all-organic Na-ion battery based on polymeric cathode and anode", Scientific Reports, 2013, 3, 2671.
Banda, et al., "A polyimide based all-organic sodium ion battery", Journal of Materials Chemistry A, 2015, 3, 10453-10458.
Li, et al., "Porous organic polymer/RGO composite as high performance cathode for half and full sodium ion batteries", Journal of Power Sources, 2017, 343, 424-430.

* cited by examiner

BHT + THBQ

X = F, Cl

BHT-BQ-COF

COVALENT ORGANIC FRAMEWORK AND ITS ELECTROCHEMICAL USE

CROSS-REFERENCE TO RELATED APPLICATION(S)

This application is a continuation-in-part of copending U.S. patent application Ser. No. 17/888,935, filed on 16 Aug. 2022. The entire disclosure of which is expressly incorporated herein by reference.

FIELD OF THE INVENTION

The invention relates to the electrochemical use of a covalent organic framework, particularly, but not exclusive to an anodic material for an energy storage device, in particular, but not exclusive to a rechargeable sodium-ion battery.

BACKGROUND

Lithium-ion batteries (LIBs) have been widely commercialized for decades for their remarkable performance, but they suffer from high costs and safety problems. Sodium-ion batteries (SIBs) are one of the alternatives to LIBs. However, obtaining high-performance cathode materials is the main issue that restrict the improvement of the capacity of SIBs.

Comparing with inorganic electrode materials, organic electrode materials are renewable, designable for specific function, and have higher theoretical gravimetric capacities. Some organic small molecules with active groups have shown excellent device performance when utilized as a cathode material for SIBs. Nevertheless, they exhibit obvious drops on the capacities from the second cycle due to their solubility in electrolytes, which is disadvantageous for long-term stability of batteries.

SUMMARY

In a first aspect, there is provided an electrode material for an energy storage device comprising a covalent organic framework having a plurality of aromatic moieties each linked by at least one thioether linkage. Preferably, each of the plurality of aromatic moieties is linked by two thioether linkages.

Optionally, each of the plurality of aromatic moieties comprises at least one carbonyl group, and preferably two carbonyl groups.

Optionally, each of the plurality of aromatic moieties is a benzoquinone moiety. The covalent organic framework may include a plurality of dithioether-linked benzoquinone moieties.

Optionally, the covalent organic framework comprises a structural representation of Formula (I):

Formula (I)

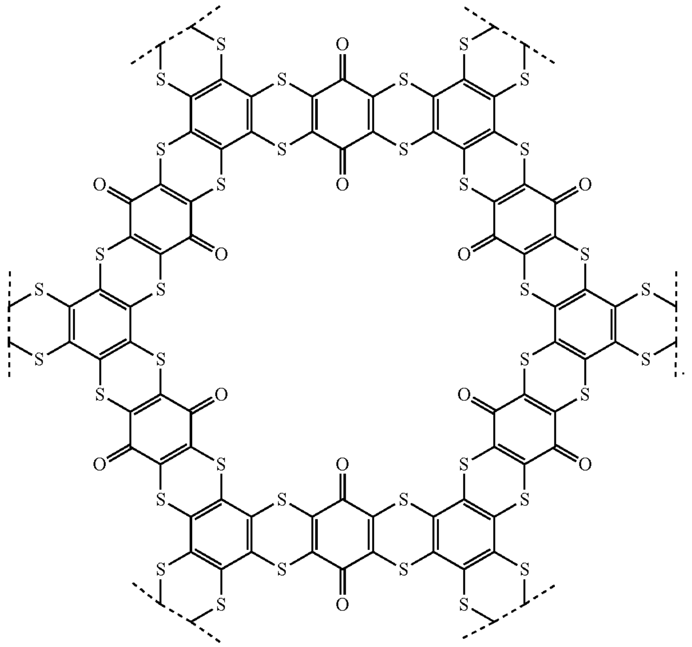

In a second aspect, there is provided an anode comprising an electrode material with a covalent organic framework that includes a plurality of aromatic moieties each being linked by at least one thioether linkage, such as the covalent organic framework comprises a structural representation of Formula (I).

In a third aspect, there is provided an energy storage device, comprising a cell having an anode, wherein the anode is formed from an electrode material with a covalent organic framework that includes a plurality of aromatic moieties each being linked by at least one thioether linkage, such as the covalent organic framework comprises a structural representation of Formula (I).

Optionally, the cell includes a cathode, wherein the cathode is formed from an electrode material with a covalent organic framework that includes a plurality of aromatic moieties each being linked by at least one thioether linkage, such as the covalent organic framework comprises a structural representation of Formula (I).

Optionally, the energy storage device comprise a half coin cell. The half coin cell may comprise a sodium-ion battery or a lithium-ion battery.

Optionally, the energy storage device comprise a full coin cell. The full coin cell may comprise a sodium-ion battery or a lithium-ion battery.

Preferably, the full coin cell may include a presodiated anode, such as a presodiated anode comprising an electrode material with the covalent organic framework as described herein, such as the covalent organic framework comprising a structural representation of Formula (I).

In a fourth aspect, there is provided a method of preparing an electrode having the electrode material in accordance with the first aspect of the present invention. The method comprises the steps of: providing a mixture of a covalent organic framework having a plurality of dithioether-linked benzoquinone moieties, a conductive material, a binder, and a solvent; and transferring the mixture onto a current collector. Preferably, the electrode comprises an anode.

Optionally, the covalent organic framework, the conductive material, and the binder has a mass ratio from about 7:2:1 to about 3:6:1.

Optionally, the method further comprises the step of presodiation of the electrode to form a presodiated anode. Preferably, the presodiated anode is formed by way of a discharging process at about 40 mA $g^{-1}$ to about 60 mA $g^{-1}$ for about 9 hours to about 11 hours. In an embodiment, the duration of the discharging process may be about 10 hours.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which.

DETAILED DESCRIPTION

Figure 1:
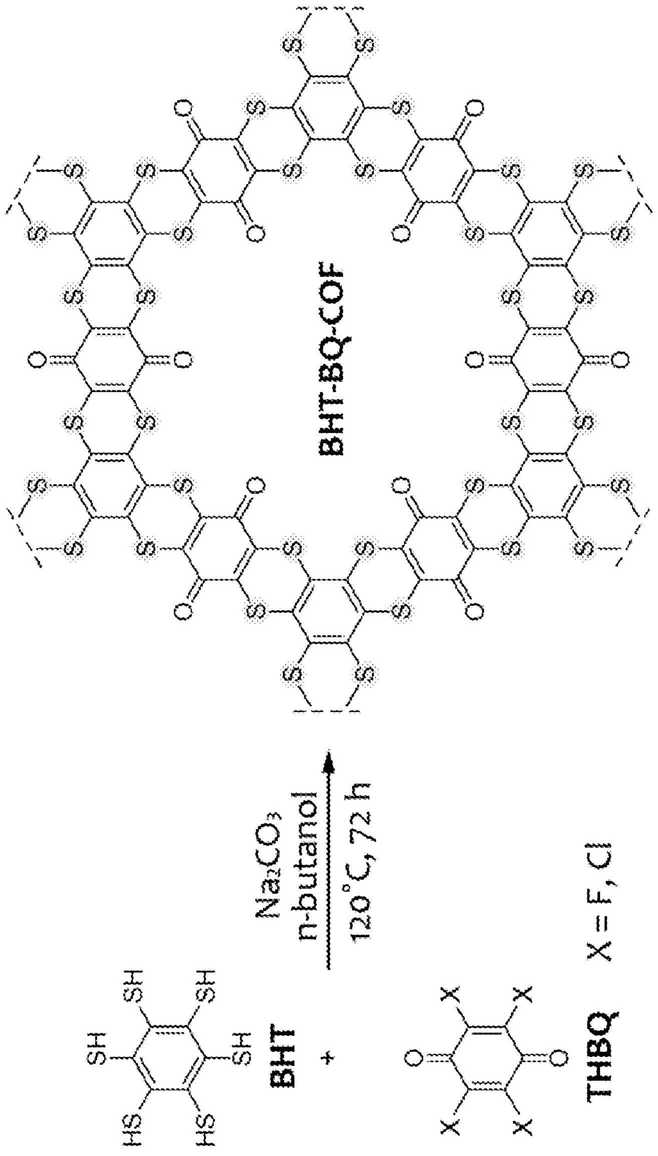
FIG. 1 is a schematic diagram of the synthesis of a covalent organic framework (referred as BHT-BQ-COF, or structural representation of Formula (I)) in accordance with one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Terms of degree, such as "substantially" or "about" are understood by those of ordinary skill to refer to reasonable ranges outside of the given value, for example, general tolerances associated with manufacturing, assembly, testing, and use of the described embodiments.

In one embodiment, there is provided a covalent organic framework (COF) that includes a plurality of aromatic moieties each linked by at least one thioether linkage. In a preferred embodiment, the COF includes a dithioether linkage. As used herein, "covalent organic framework" refers to an organic crystalline porous material that integrates molecular building blocks (i.e., the aromatic moieties) connected by covalent linkages and integrated into a periodic structure, which may be extended into two or three dimensions. In one embodiment, the COF may have a porous yet rigid structure.

As will be appreciated by those skilled in the art, due to the purely covalently bonded and metal-free structures of COFs, they generally exhibit excellent chemical stability in organic solvents and withstand harsh conditions (e.g., acidic and basic conditions) to maintain their ordered structures and crystallinity. As such, the COF in the present embodiment may be used in gas separation and storage, heterogeneous catalysis, chemical sensing, luminescence, electronic devices, drug delivery, and energy storage and conversion.

As used herein, an "aromatic moiety" includes any of substituted or unsubstituted $C_{3-8}$ cycloalkyl, substituted or unsubstituted $C_{3-8}$ cycloalkenyl, substituted or unsubstituted 3 to 8 membered heterocycloalkyl, substituted or unsubstituted 3 to 8 membered heterocycloalkenyl, substituted or unsubstituted $C_{6-10}$ aryl, substituted or unsubstituted $C_{7-11}$ aralkyl, substituted or unsubstituted heteroaryl having 5 to 10 carbon atoms or heteroatoms. Preferably, the aromatic moiety includes at least one carbonyl group, e.g., a benzoquinone moiety with two carbonyl groups, such as o-benzoquinone, p-benzoquinone and the like.

A "thioether linkage" refers to the covalent linkage connecting the building blocks including a R—S—R' bond where R is one of the aromatic moieties and R' is the adjacent aromatic moiety or a functional group that is connected to the adjacent aromatic moiety. A "dithioether linkage" means two thioether linkages, i.e., there are two said R—S—R' bonds connected between the pair of aromatic moieties. The functional group for R' may be any of substituted or unsubstituted $C_{3-8}$ cycloalkyl, substituted or unsubstituted $C_{3-8}$ cycloalkenyl, substituted or unsubstituted 3 to 8 membered heterocycloalkyl, substituted or unsubstituted 3 to 8 membered heterocycloalkenyl, substituted or unsubstituted $C_{6-10}$ aryl, substituted or unsubstituted $C_{7-11}$ aralkyl, substituted or unsubstituted heteroaryl having 5 to 10 carbon atoms or heteroatoms. Preferably, the linkage between the aromatic moieties is a benzenehexathiol group.

In one embodiment, the COF may be prepared from an aromatic compound and a thiol. For example, the aromatic compound may be a quinone, more preferably a halogen-substituted quinone. The thiol may be an aromatic thiol having at least one S—H group for forming at least one thioether linkage in the COF.

The method of preparing the COF may including the steps of: mixing the aromatic compound and the thiol to form a mixture, degassing the mixture, and heating the degassed mixture.

The step of mixing may involve a condensation or a cross-coupling reaction between the aromatic compound and the thiol. For example, the step of mixing may be performed in a reaction vessel specifically designed for use in air-sensitive chemistry, e.g., a Schlenk flask or tube. The step of mixing may further include mixing a base and a solvent with the aromatic compound and the thiol to form the mixture. The base may be any one of sodium carbonate, potassium carbonate, cesium carbonate, sodium hydroxide, sodium methoxide, and N,N-diethylethanamine. The solvent may be any one of 1,2-dichlorobenzene, n-butanol, 1,4-dioxane, mesitylene, N-methylpyrrolidone, N,N-dimethylacetamide, or a mixture thereof.

After the step of mixing and before the step of degassing, the method may further include sonicating the mixture to form a homogeneous mixture. For example, the mixture may be sonicated for about 1 min to about 30 min, about 3 min to about 15 min, or about 5 min to about 12 min.

As will be appreciated by those skilled in the art, during the step of degassing, dissolved gasses (e.g., oxygen, carbon dioxide, etc.) that may otherwise impede the chemical reactions involving sensitive reagents, interfere with spectroscopic measurements, or induce unwanted bubble formation are removed from the mixture.

In one embodiment, the step of degassing includes subjecting the mixture to at least one freeze-pump-thaw cycle, which involves (i) freezing the mixture, (ii) applying vacuum to the frozen mixture, then (iii) sealing and warming the mixture. Specifically, the mixture in the reaction vessel is first sealed to prevent a flow of inert gas into the vessel whilst being frozen in, e.g., liquid nitrogen or dry ice for the mixture to reach a temperature below about 80 K. Once the mixture in the vessel has frozen, the vessel can be unsealed while being kept under vacuum for about 1 min to about 20 min, about 3 min to about 15 min, or about 5 min to about 10 min, allowing evacuation of the headspace. The vessel may also remain submerged in liquid nitrogen or dry ice during vacuum application. Next, the vessel may be sealed again under vacuum and removed from the liquid nitrogen or dry ice to allow the mixture to reach room temperature. This may in addition involve the use of a heat source to speed up warming of the mixture. As the mixture thaws, the dissolved gasses escape into the headspace. This process may be repeated for 10 times, 5 times, or 3 times to remove the undesired dissolved gasses.

Alternatively or additionally, the step of degassing may involve heating, ultrasonic agitation, chemical removal of gasses, substitution with inert gas by bubbling, etc.

The method may then proceed to the step of heating the degassed mixture, e.g., at about 30° C. to about 300° C., about 40° C. to about 200° C., or about 60° C. to about 130° C., for about 24 hours to about 120 hours, about 48 hours to about 96 hours, or about 72 hours. The heated mixture may then be allowed to cool down to room temperature, before being filtered, washed (e.g., with water, dimethylformamide, tetrahydrofuran, and dichloromethane) and dried to obtain the COF. Without wishing to be bound by theories, it is believed that the synthesis in the present embodiment achieves a product yield of about 65% to about 85%.

In a preferred embodiment, the COF is BHT-BQ-COF (i.e. the COF with a structural representation of Formula (I)), which is constructed of dithioether-linked benzoquinone moieties:

Formula (I)

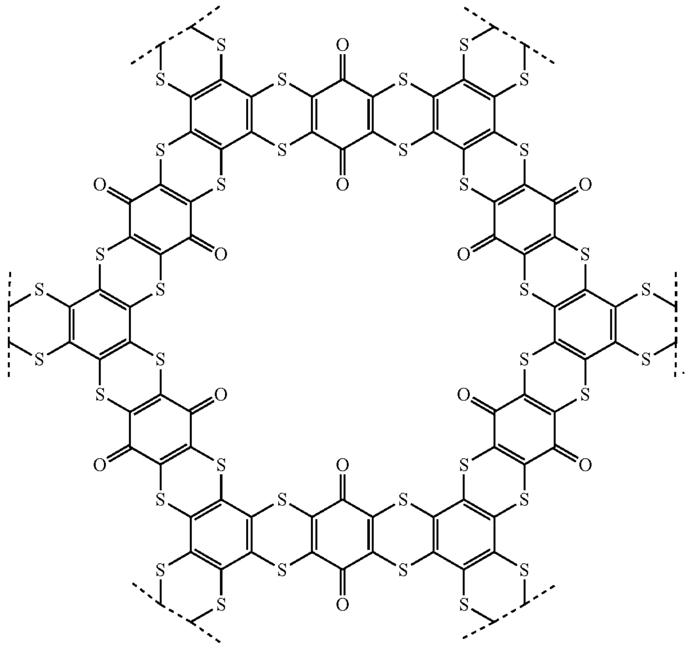

FIG. 1 shows the synthesis of BHT-BQ-COF which involves a cross-coupling reaction between a halogen-substituted quinone and an aromatic thiol. In the illustrated embodiment, the aromatic thiol is 1,2,3,4,5,6-benzenehexathiol (BHT), and the halogen-substituted quinone is a tetrahalogen-substituted benzoquinone (THBQ), e.g., 2,3,5,6-tetrafluoro-1,4-benzoquinone (TFBQ) or 2,3,5,6-tetrachloro-1,4-benzoquinone (TCBQ). They are mixed with sodium carbonate as the base and n-butanol as the solvent in the step of mixing, before being degassed and heated at 120° C. for 72 hours.

As discussed above, the COF may be used in energy storage applications. More specifically, the COF may be used as an electrode (e.g., a cathode) in an energy storage device, e.g., a sodium-ion battery or a lithium-ion battery that may be rechargeable. The redox active sites provided by the sulfur atoms of the thioether linkages and the carbonyl groups of the quinone moieties, as well as the porous and rigid structure, facilitate diffusion of ions (e.g., ion insertion and extraction) of the device and provide excellent stability of the electrode in the electrolyte, thus maximizing the capacity and providing excellent reversibility for the device.

Figure 2:
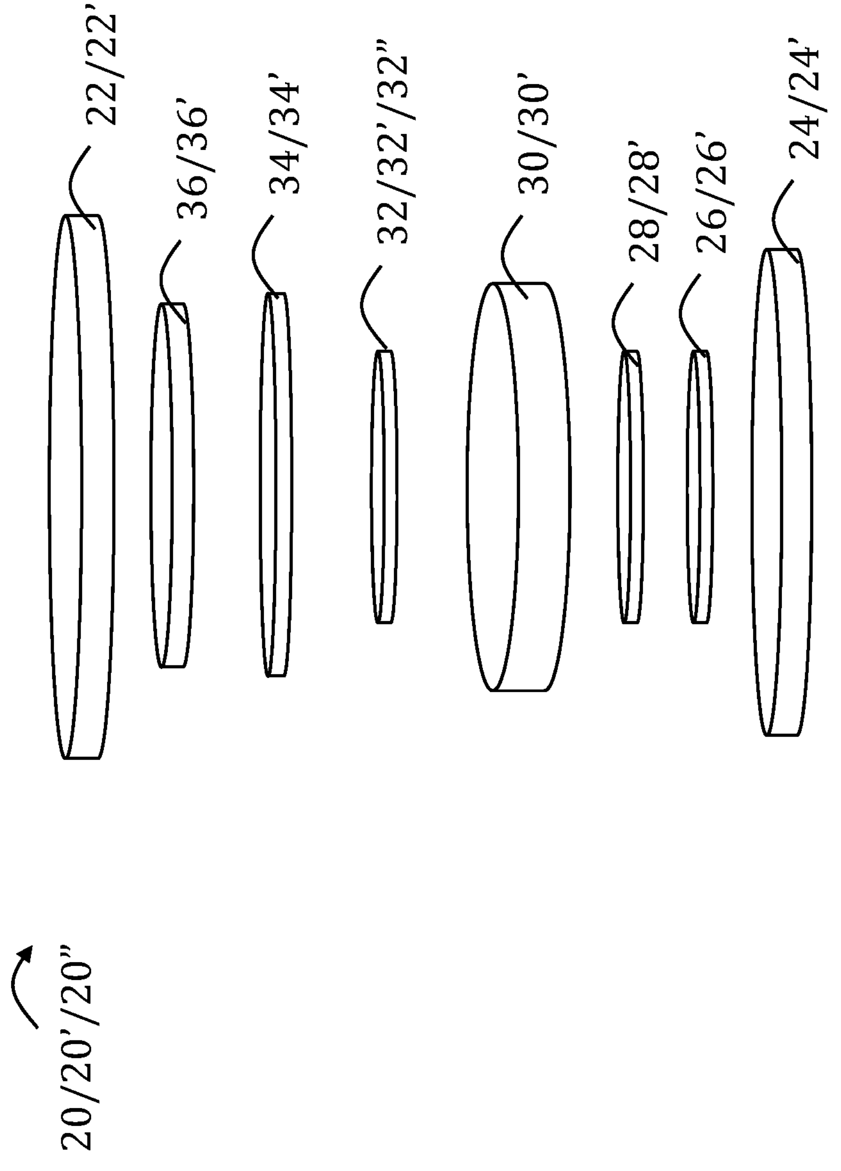
FIG. 2 is a schematic exploded view of an energy storage device in accordance with one embodiment of the invention.

FIG. 2 shows an example energy storage device 20 that utilizes a COF as a cathode. The illustrated energy storage device 20 takes the form of a coin cell. The coin cell 20 includes a casing with a larger case 22 (e.g., the positive side) and a smaller case 24 (e.g., the negative case). The components within the casing include, assembled in the following order: an o-ring 26 adjacent the smaller case 24, a spring 28, a spacer 30, an anode 32, a separator 34 and an electrolyte, and a cathode 36 adjacent the larger case 22 having a cast film closer to the anode 32. The spacer 30 may be a stainless steel spacer. The anode 32 may be a metal piece, such as a metal foil, a metal disc, etc. The spacer 30 and the anode 32 may be first coupled together before the assembly of the coin cell 20. The separator may be placed closer to the anode than the spacer, and may be a glass fiber. The electrolyte may be a liquid, gel, or solid electrolyte, e.g., sodium bis(fluorosulfonyl)imide (NaFSI), sodium bis(trifluoromethanesulfonyl)imide (NaTFSI), or sodium hexafluorophosphate ($NaPF_6$). The electrolyte may further include a solvent, e.g., diglyme or 1-methyl-1-propylpyrrolidinium bis(trifluoromethanesulfonyl)imide (py13TFSI). Preferably, the electrolyte has a concentration of about 0.5 M to about 4.0 M of the above material in the solvent.

The cathode 36 may include the COF, a conductive material, a binder, and a current collector. The conductive material may include conductive carbon, such as Super P, Ketjen Black, or carbon nanotube, etc. The binder may include polyvinylidene fluoride (PVDF). The current collector may be a copper or aluminum foil. The cathode 36 is preferably centered as much as possible with the anode 32 to avoid uneven current densities.

In one embodiment, the preparation of the cathode 36 includes the steps of: mixing the COF, the conductive material, the binder, and a solvent (e.g., N-methyl-2-pyrrolidone (NMP)) to form a slurry, pasting the slurry onto the current collector, and drying the assembly. Preferably, the mass ratio of the COF, the conductive material, and the binder in the slurry is about 7:2:1 to about 3:6:1. The step of drying may be performed in a vacuum oven at about 30° C. to about 150° C., about 50° C. to about 130° C., or about 60° C. to about 120° C., for about 3 h to about 48 h, about 5 h to about 36 h, or about 6 h to about 24 h.

In one embodiment, the preparation of the energy storage device 20 includes the step of: assembling the components of the device 20 in the above-mentioned order, and packing the larger case 22 and the smaller case 24 together with a pressure of about 0.1 kPa to about 1.5 kPa, about 0.5 kPa to about 1.0 kPa, or about 0.75 kPa to about 0.85 kPa. The step of assembling may include the following steps in sequential order: pressing the anode 32 against the spacer 30, placing and pressing the o-ring 26 onto the smaller case 24, placing the spring 28 on top and then the spacer 30 and anode 32 (with the anode 32 facing upwards), placing the separator 34 on top as centered as possible, dropping the electrolyte (e.g., about 100 μL to about 300 μL) onto the separator 34, placing the cathode 36 on top (with the cast film facing the anode 32), and placing the larger case 22 on top.

Without intending to be limited by theory, the inventors have, through their own researches, trials, and experiments, devised that the COF as mentioned herein may be further used as an anode for the energy storage device, such as the sodium-ion battery or the lithium-ion battery as mentioned herein. The energy storage device may be in form of, for example, a coin/button cell, a coin pouch cell, a pouch cell, a cylindrical cell, prismatic cell and the like. In one embodiment, the energy storage device may be in form of a coin cell, such as a half coin cell or a full coin cell.

Turning now again to FIG. 2, there is an example energy storage device 20' that utilizes the COF as mentioned herein as an anode. In this example embodiment, the illustrated energy storage device 20' takes the form of a half coin cell. The half coin cell 20' includes a casing with a larger case 22' (e.g., the positive side) and a smaller case 24 (e.g., the negative case). The components within the casing include, assembled in the following order: an o-ring 26' adjacent the smaller case 24', a spring 28', a spacer 30', an anode 32', a separator 34' and an electrolyte, and a cathode 36' adjacent the larger case 22 having a cast film closer to the anode 32'. The spacer 30' may be a stainless steel spacer. The cathode 36' may be a metal piece, such as a metal foil, a metal disc, etc. The spacer 30' and the anode 32' may be first coupled together before the assembly of the coin cell 20'. The separator may be placed closer to the anode than the spacer, and may be a glass fiber. The electrolyte may be a liquid, gel, or solid electrolyte, e.g., sodium bis(fluorosulfonyl)imide (NaFSI), sodium bis(trifluoromethanesulfonyl)imide (NaTFSI), or sodium hexafluorophosphate ($NaPF_6$). The electrolyte may further include a solvent, e.g., diglyme or 1-methyl-1-propylpyrrolidinium bis(trifluoromethanesulfonyl)imide (py13TFSI). Preferably, the electrolyte has a concentration of about 0.5 M to about 4.0 M of the above material in the solvent.

The anode 32' may include the COF such as the one having the structural representation of Formula (I), a conductive material, a binder, and a current collector. The conductive material may include conductive carbon, such as Super P, Ketjen Black, or carbon nanotube, etc. The binder may include polyvinylidene fluoride (PVDF). The current collector may be a copper or aluminum foil. The anode 32' is preferably centered as much as possible with the cathode 36' to avoid uneven current densities.

The anode 32' may be prepared by the steps of: providing a mixture of the COF as mentioned herein, a conductive material, a binder, and a solvent; and transferring the mixture onto the current collector. In particular, the mixture may be a slurry obtained by mixing the COF, the conductive material, the binder, and a solvent (e.g., NMP). The slurry may then be pasted onto the current collector to form an assembly, which may be subsequently dried. Preferably, the mass ratio of the COF, the conductive material, and the binder in the slurry is about 7:2:1 to about 3:6:1. The step of drying may be performed in a vacuum oven at about 30° C. to about 150° C., about 50° C. to about 130° C., or about 60° C. to about 120° C., for about 3 h to about 48 h, about 5 h to about 36 h, or about 6 h to about 24 h.

Further referring to FIG. 2, in one embodiment, the illustrated energy storage device may takes the form of a full coin cell 20". The full coin cell 20" may be constructed in a similar manner as the device 20' expect that the cathode is cathode 36, i.e., the cathode having the COF as mentioned herein; and the anode is a presodiated anode 32". The term "presodiated anode" generally denotes that the anode is configured to have an excessive amount of sodium ions by way of a presodiation process as compared with the one without subjecting to the presodiation process. It is believed that by enhancing the sodium ion content of the anode, it may reduce/minimize the consumption of sodium ion from the lattice structure of the anode and/or from the electrolyte during cycling operation, thus enhancing the integrity of the anode and/or the stability of the electrolyte during operation, and therefore enhancing the overall electrochemical performance of the battery. Preferably, the presodiated anode, as compared with the anode without presodiation, may have an excessive/additional amount of sodium ion of at least about 70%, at least 80%, at least about 90%, from about 90% to about 100%, from about 92% to about 100%, from about 95% to about 99%, from about 95% to about 100%, from about 98% to about 100%, or about 100%.

In one embodiment, the presodiated anode 32" may be prepared by performing a presodiation step on a pristine anode of the present invention such as the as-formed anode 32'. In particular, the presodiation process may be enabled by way of an electrochemical process such as a discharging process. In an example embodiment, the as-formed anode 32' may be fabricated with a cathode to form a half cell, such as the half coin cell 20'. The half coin cell may then be arranged to undergo a discharging process at a current density of about 40 mA $g^{-1}$ to about 60 mA $g^{-1}$, about 45 mA $g^{-1}$ to about 60 mA $g^{-1}$, about 45 mA $g^{-1}$ to about 58 mA $g^{-1}$, about 48 mA $g^{-1}$ to about 58 mA $g^{-1}$, about 48 mA $g^{-1}$ to about 55 mA $g^{-1}$, about 48 mA $g^{-1}$ to about 52 mA $g^{-1}$, about 50 mA $g^{-1}$ to about 52 mA $g^{-1}$, or particularly about 50 mA $g^{-1}$. The discharging process may be performed for a duration from about 9 hours to about 11 hours, from about 9 to about 11.5 hours, from about 9.5 to about 11 hours, from about 9.5 to about 10.5 hours, or in particular, about 10 hours. After the discharging process, the presodiated anode may be isolated from the half-cell under an inert environment, such as in a glovebox supplied with inert gas (e.g., argon).

In an alternative or additional embodiment, the presodiation process may be performed by way of, for example, direct contacting the anode 32' with sodium metal or presodiation reagents (e.g., sodium naphthaline, sodium phenyl, etc.). For example, the anode 32' may be pressed with a sodium metal foil, or dispersed with sodium powder or presodiation reagents, or ball milling the COF with sodium metal upon the fabrication of anode 32', etc.

In one embodiment, the preparation of the energy storage devices 20'/20" includes the step of: assembling the components of the device 20'/20" in the above-mentioned order, and packing the larger case 22 and the smaller case 24 together with a pressure of about 0.1 kPa to about 1.5 kPa, about 0.5 kPa to about 1.0 kPa, or about 0.75 kPa to about 0.85 kPa. The step of assembling may include the following steps in sequential order: placing and pressing the o-ring 26' onto the smaller case 24', placing the spring 28' on top and then the spacer 30' and anode 32'/32" (with the anode 32'/32" facing upwards), placing the separator 34' on top as centered as possible, dropping the electrolyte (e.g., about 100 μL to about 300 μL) onto the separator 34', placing the cathode 36/36' on top (with the cast film facing the anode 32'/32"), and placing the larger case 22' on top.

Hereinafter, the present invention is described more specifically by way of examples, but the present invention is not limited thereto.

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise. It is understood that unless otherwise specifically noted, the materials compounds, chemicals, etc. described herein are typically commodity items and/or industry-standard items available from a variety of suppliers worldwide. All the reagents and solvents are used without further purification unless otherwise specified. The n-butanol, 1,2-dichlorobenzene, and 1,4-dioxane are purchased as extra dry grade with water lower than 50 ppm.

Example 1

Synthesis of BHT-BQ-COF

A Schleck tube was charged with 1,2,3,4,5,6-benzenehexathiol (BHT, 40.0 mg), 2,3,5,6-tetrachloro-1,4-benzoquinone (TCBQ 54.5 mg), sodium carbonate (122.3 mg), and n-butanol (2 mL). The mixture was frozen to 78 K in a liquid nitrogen bath and evacuated for 10 min, followed by warming to room temperature after sealing. After another two freeze-pump-thaw cycles, the mixture was heated to 120° C. and reacted for 72 h. The crude produce was filtered and washed with water, dimethylformamide, tetrahydrofuran, and dichloromethane to yield a brown solid (49.4 mg, 79.5%).

Example 2

Synthesis of benzo[5,6][1,4]dithiino[2,3-b]thianthrene-6,13-dione (Model Compound)

Benzene-1,2-dithiol (100 mg, 0.7 mmol), 2,3,5,6-tetrachloro-1,4-benzoquinone (72 mg, 0.3 mmol), and potassium carbonate (249 mg, 1.8 mmol) were charged in a flask. After evacuating and filling with argon, N,N'-dimethylformamide (5 mL) was added and stirred at 90° C. for 24 h. The product was purified by column chromatography to give a red-brown solid (81 mg, 70%).

Example 3

Characterization of BHT-BQ-COF and the Model Compound

Figure 3:
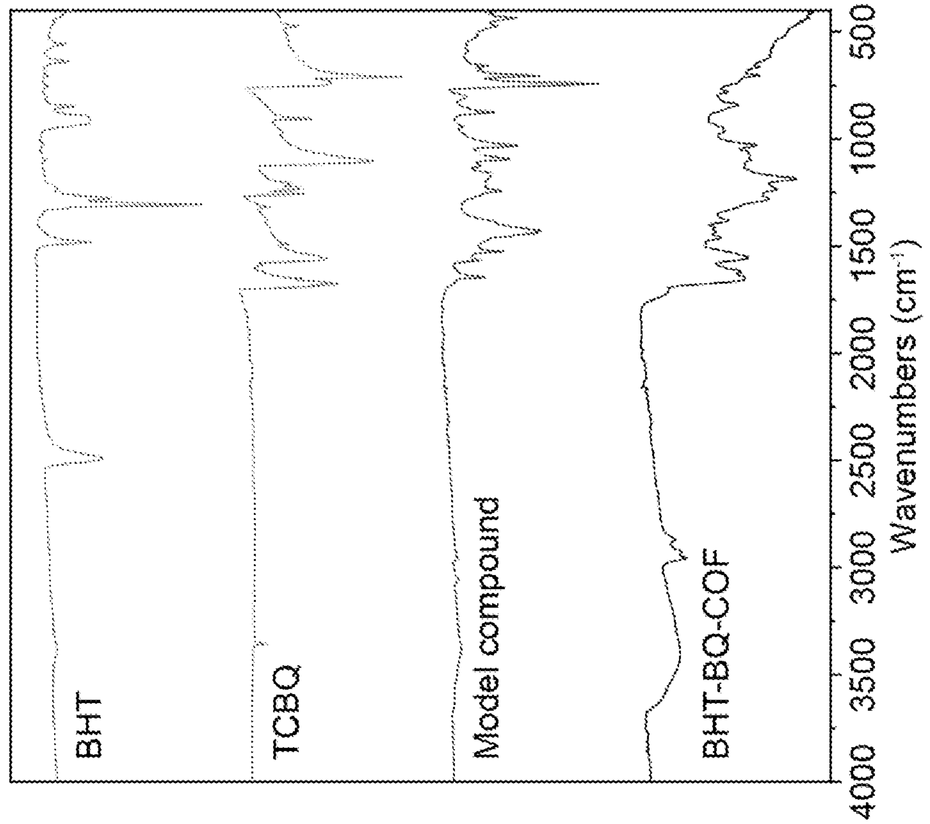
FIG. 3 shows the Fourier transform infrared (FT-IR) spectra of the precursors of BHT-BQ-COF, model compound, and BHT-BQ-COF.

To verify the conformation of the dithioether linkage in BHT-BQ-COF, Fourier transform infrared (FTIR) spectra of the precursors of BHT-BQ-COF (i.e., 1,2,3,4,5,6-benzenehexathiol (BHT) and 2,3,5,6-tetrachloro-1,4-benzoquinone (TCBQ)), the BHT-BQ-COF of Example 1, and the model compound of Example 2 were obtained. FTIR spectra were recorded on a PerkinElmer Spectrum Two FTIR Spectrometer. As shown in FIG. 3, the disappearance of the —S—H bonds (~2500 $cm^{-1}$) of BHT in BHT-BQ-COF indicates the fully conversion of the precursors after the coupling reaction. The appearance of the —C—S bonds (703 $cm^{-1}$ and 664 $cm^{-1}$) and ═C—S—C bonds (1233 $cm^{-1}$ and 1028 $cm^{-1}$) of BHT-BQ-COF indicates the formation of the dithioether linkage, which are in accordance with the peaks of the model compound at 705 $cm^{-1}$, 658 $cm^{-1}$, 1243 $cm^{-1}$, and 1030 $cm^{-1}$, respectively.

Figure 4:
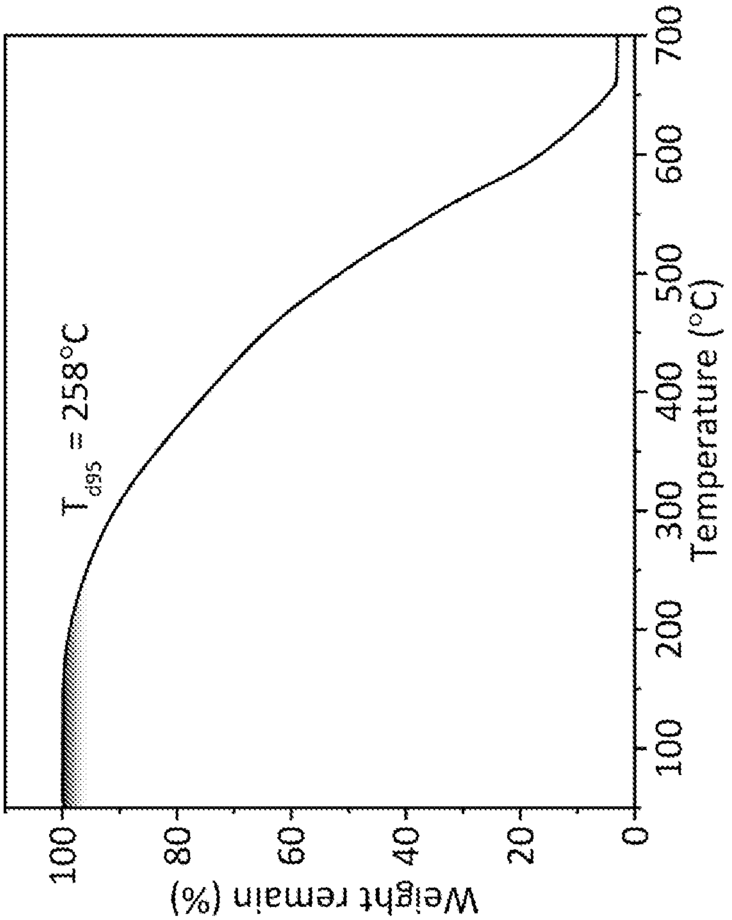
FIG. 4 is a thermogravimetric curve of BHT-BQ-COF.

The thermal stability of BHT-BQ-COF was measured on a PerkinElmer STA 6000 using ceramic pan as the container. As shown by the thermogravimetric analysis in FIG. 4, more than 90% of the initial weight can be remained when the temperature reaches 230° C. The apparent drop before 100° C. can be ascribed to the moisture adsorbed by BHT-BQ-COF. This demonstrates the good thermal stability of BHT-BQ-COF.

Example 4

Fabrication of a BHT-BQ-COF-Based Cathode

BHT-BQ-COF, Ketjen Black, and polyvinylidene fluoride (PVDF) were mixed in N-methyl-2-pyrrolidone (NMP) with a mass ratio of 5:4:1 to form a slurry. The obtained slurry was pasted onto an Al foil and dried at 80° C. for 12 h in a vacuum oven.

Example 5

Fabrication of a Half SIB Coin Cell with the BHT-BQ-COF-Based Cathode

A sodium disk was first pressed to the stainless steel spacer. Then an o-ring was placed on the smaller case and pressed against the case. Next, a spring, the assembled stainless steel spacer and sodium disk were placed on the o-ring sequentially, with the sodium disk facing upwards. After that, a separator (glass fiber) was placed on top of the sodium disk as centered as possible. 200 μL of 1M sodium hexafluorophosphate ($NaPF_6$) in diglyme as the electrolyte was then dropped onto the separator. Next, the BHT-BQ-COF-based cathode obtained in Example 4 was placed on top, with the cast film facing the sodium disk and centered as much as possible with the sodium disk to avoid uneven current densities. Finally the larger case was placed on top and the coin cell was packed with 0.8 kPa pressure.

Example 6

Figure 5:
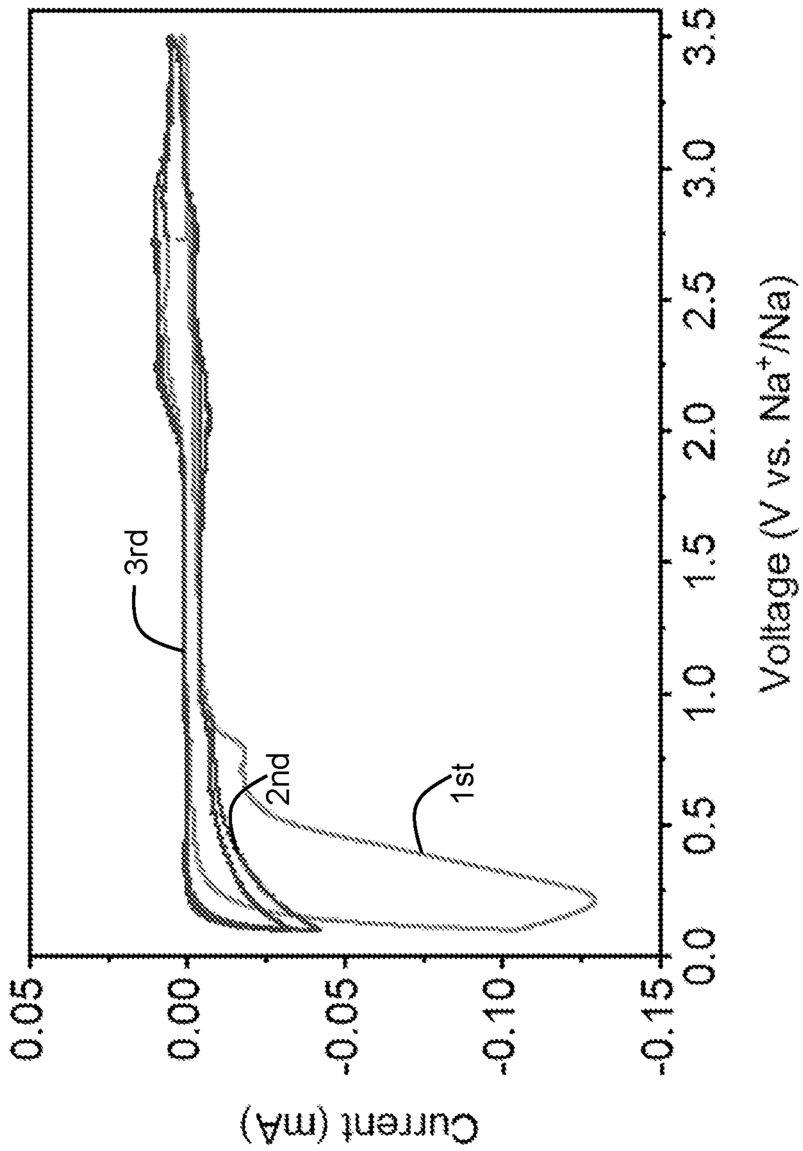
FIG. 5 shows the cyclic voltammetry (CV) curves of a BHT-BQ-COF-based cathode in a sodium-ion battery for the initial three cycles scanned at 0.1 mV $s^{-1}$ with a voltage range of 0.1 V to 3.5 V.

Electrochemical Performance of the Half SIB Coin Cell with the BHT-BQ-COF-Based Cathode Coin cells of CR2032 were first assembled in an argon-filled glovebox ($O_2$≤0.1 ppm, $H_2O$≤0.1 ppm). These coin cells were used to investigate the electrochemical performance of the half SIB coin cell obtained in Example 5, with Na foil as the counter electrode (Na//BHT-BQ-COF SIB). FIG. 5 shows the cyclic voltammetry (CV) curves of the half SIB coin cell. The CV tests were carried out on a Zahner electrochemical workstation with a voltage range of 0.1 V to 3.5 V and a scan rate of 0.1 mV $s^{-1}$. As shown in FIG. 5, the broad peak located at 0.1 V to 1.0 V during the first anodic process is attributed to the formation of solid electrolyte interphase (SEI) on the electrode surface. The redox peaks located at 2.23/2.13 and 2.82/2.74 demonstrate the reversible redox reaction of BHT-BQ-COF electrode.

Figure 6:
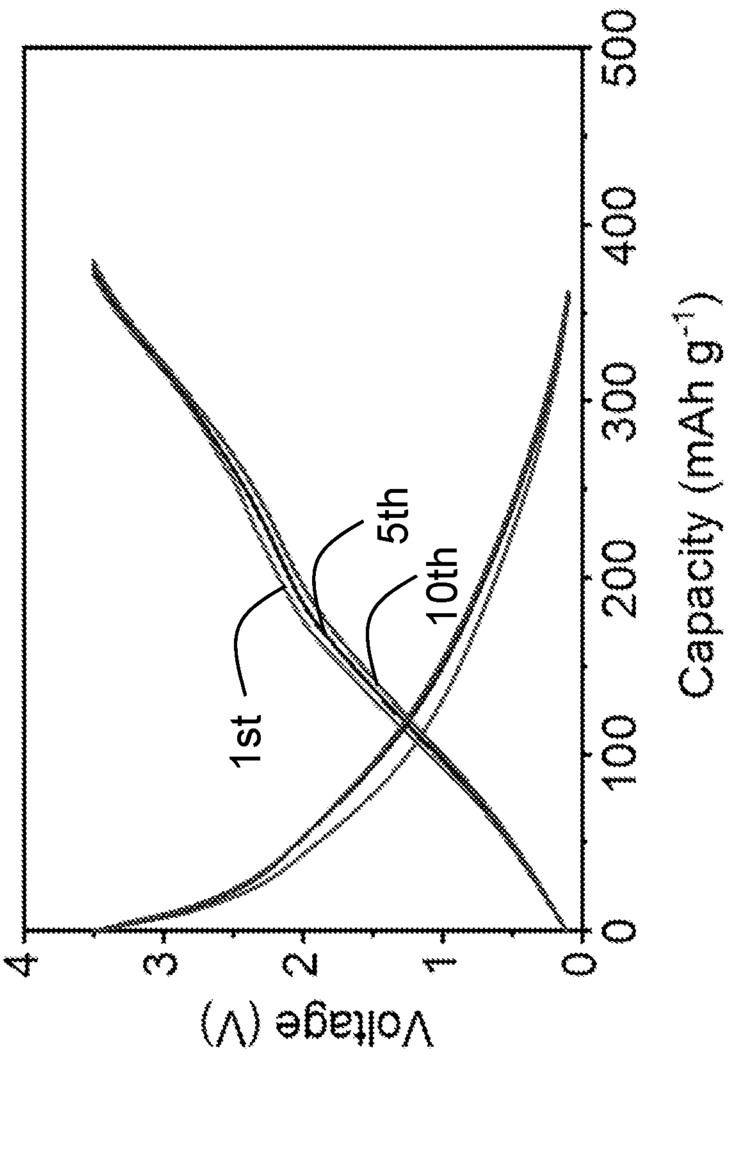
FIG. 6 shows the voltage-capacity curves of the BHT-BQ-COF-based cathode in the sodium-ion battery at the first, fifth, and tenth cycles.

FIG. 6 shows the voltage-capacity curves of the BHT-BQ-COF-based electrode in the sodium-ion battery at the first, fifth, and tenth cycles. They demonstrate the Na storage performance of the BHT-BQ-COF-based electrode in SIBs with a high reversible capacity of about 350 mAh $g^{-1}$ at a current density of 20 mA $g^{-1}$, indicating the abundant redox active sites of BHT-BQ-COF.

Figure 7B:
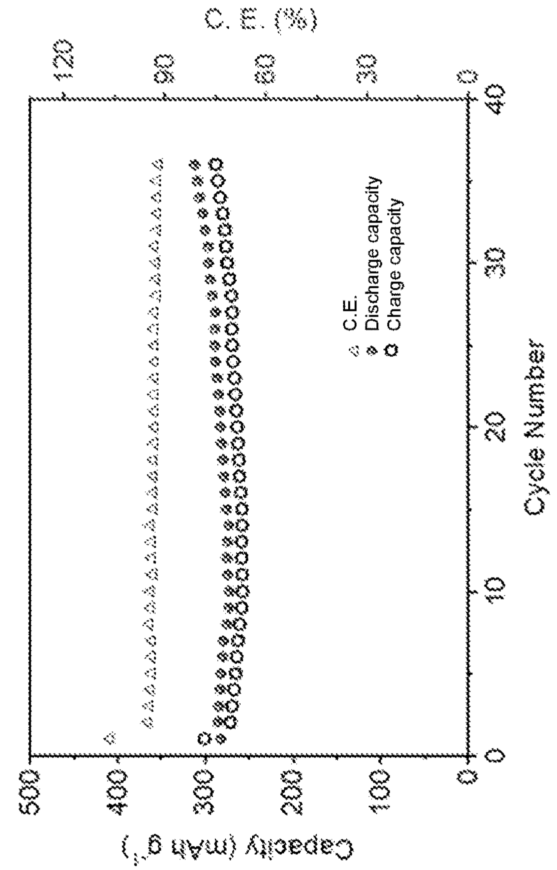
FIG. 7B is a graph of capacity and coulombic efficiency against cycle number of the BHT-BQ-COF-based cathode in the sodium-ion battery at the current density of 400 mA $g^{-1}$.
Figure 7A:
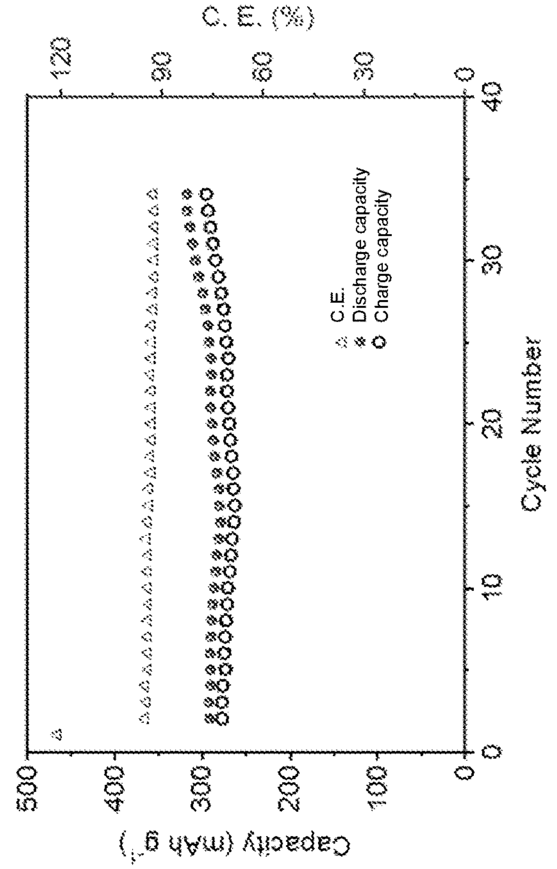
FIG. 7A is a graph of capacity and coulombic efficiency against cycle number of the BHT-BQ-COF-based cathode in the sodium-ion battery at the current density of 200 mA $g^{-1}$.
Figure 8:
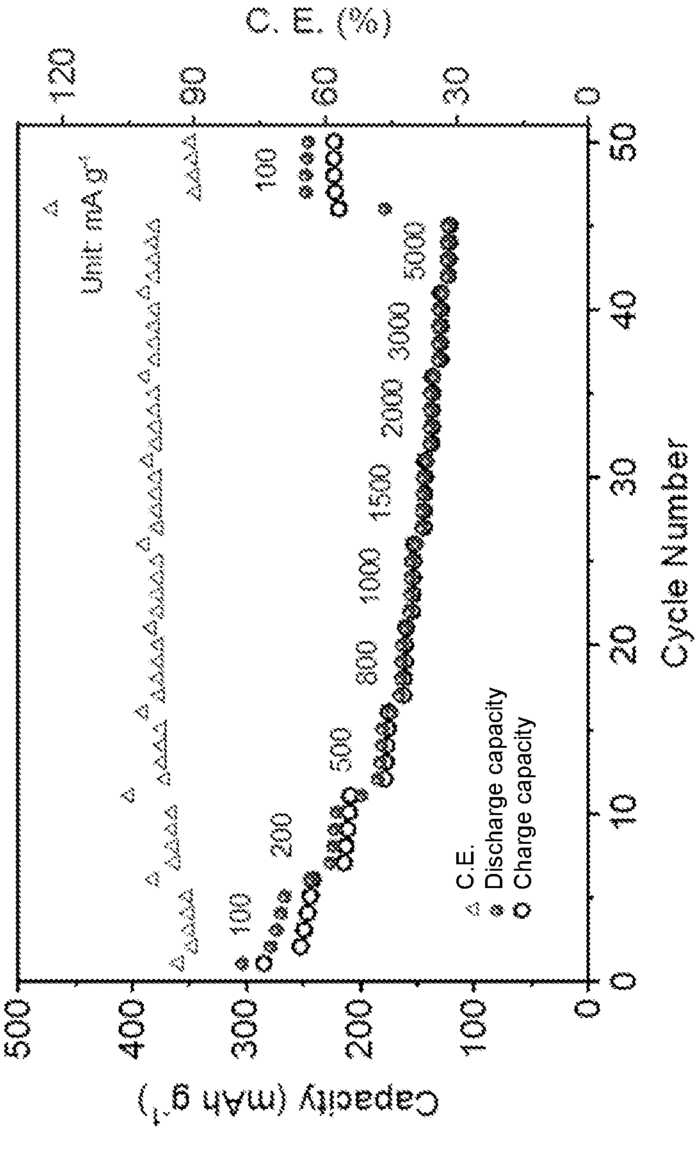
FIG. 8 is a graph of capacity and coulombic efficiency against cycle number of the BHT-BQ-COF-based electrode in the sodium-ion battery at a wide current density range of 100 mA $g^{-1}$ to 5000 mA $g^{-1}$ with a voltage range of 0.1 V to 3.5 V.

Galvanostatic charge/discharge measurements were performed on a MACCOR battery cycler at current densities of 100, 200, 400, 500, 800, 1000, 1500, 2000, 3000 and 5000 mA $g^{-1}$. FIGS. 7A and 7B show the high cycling stability with reversible capacities of 290 mAh $g^{-1}$ and 282 mAh $g^{-1}$ at the current densities of 200 mA $g^{-1}$ and 400 mA $g^{-1}$, respectively, which is associated with the stable structure of BHT-BQ-COF. FIG. 8 shows the superior rate capability of the BHT-BQ-COF-based electrode at a wide current density range of 100 mA $g^{-1}$ to 5000 mA $g^{-1}$ with a voltage range of 0.1 V to 3.5 V, showing the fast $Na^+$ diffusion kinetics of the electrode.

Figure 9:
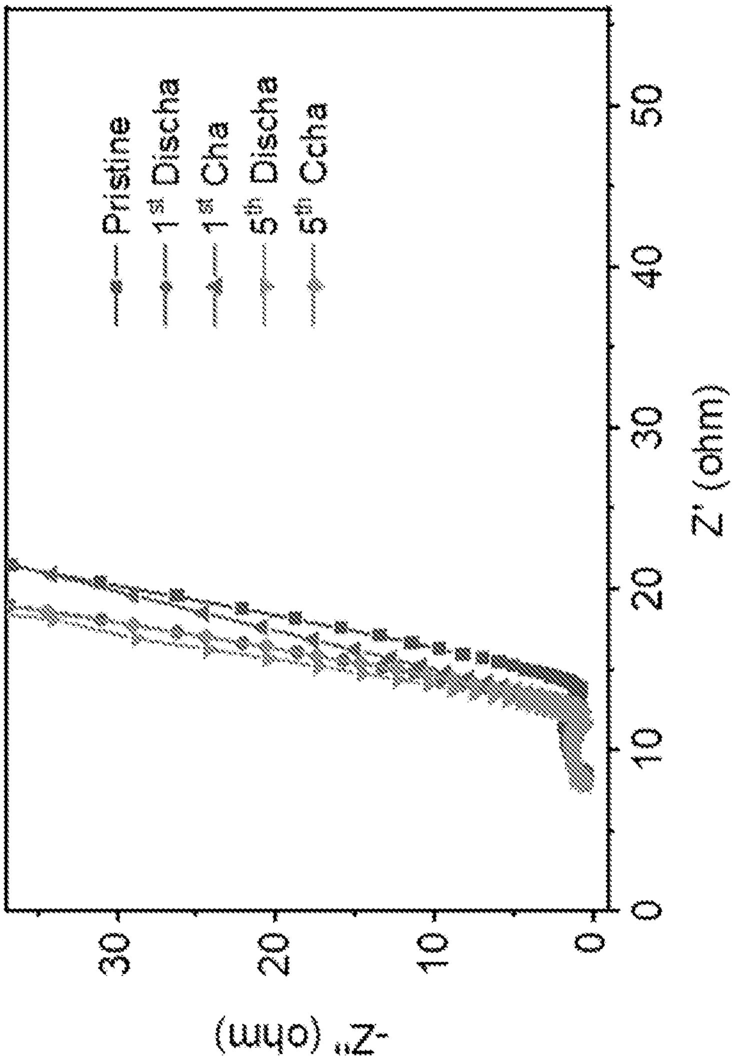
FIG. 9 show the electrochemical impedance spectroscopy (EIS) curves of the sodium-ion battery Na//BHT-BQ-COF-based electrode at different charge and discharge states with a wide frequency range from 100 kHz to 100 mHz.
Figure 10A:
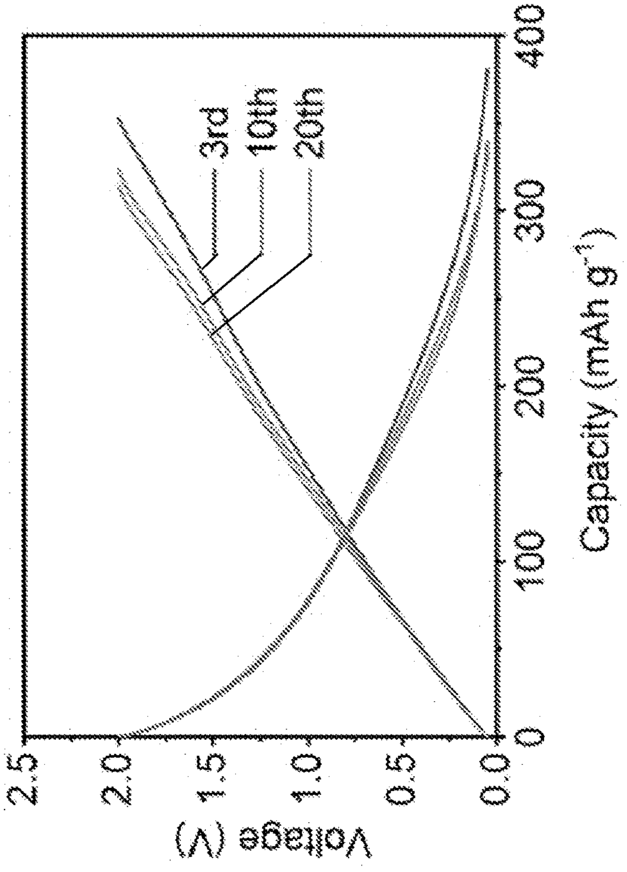
FIG. 10A is a plot of the charge/discharge curves of the BHT-BQ-COF-based anode in sodium-ion battery (SIB) at a current density of about 20 mA $g^{-1}$ in a voltage range of about 0.05 V to about 2 V, at the third, tenth and twentieth cycles.
Figure 10B:
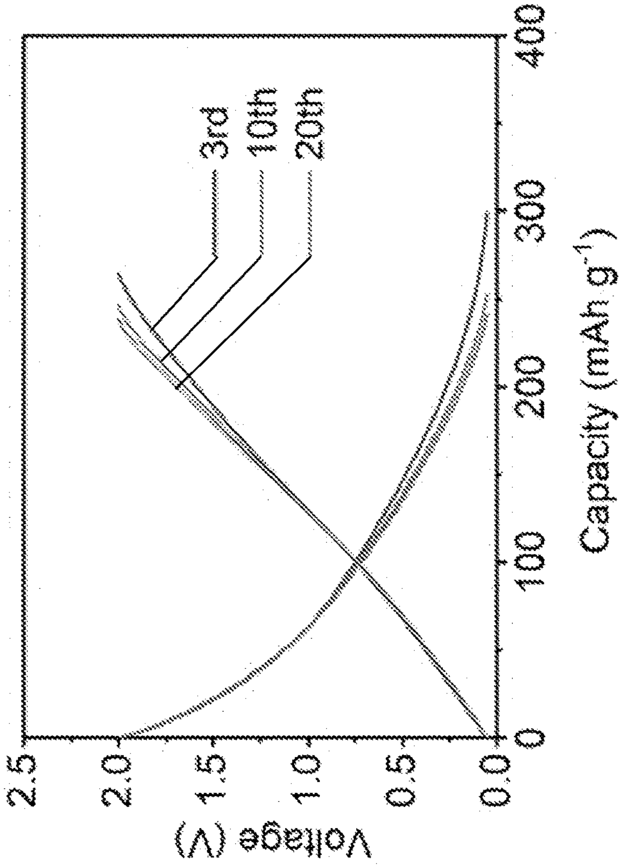
FIG. 10B is a plot of the charge/discharge curves of the BHT-BQ-COF-based anode in sodium-ion battery (SIB) at a current density of about 50 mA $g^{-1}$ in a voltage range of about 0.05 V to about 2 V, at the third, tenth and twentieth cycles.

FIG. 9 show the electrochemical impedance spectroscopy (EIS) curves of the cell of Na//BHT-BQ-COF-based electrode at different charge and discharge states with a wide frequency range from 100 kHz to 100 mHz. Electrochemical impedance spectroscopy (EIS) was obtained by applying a sine wave with an amplitude of 10 mV in the frequency range from 100 kHz to 100 mHz on Solartron 1400 electrochemical workstation. As shown in FIG. 9, the charge-transfer resistance ($R_{ct}$) corresponds to the semicircle at high frequencies. The small $R_{ct}$ in the cell of Na//BHT-BQ-COF remains constant after the charge and discharge processes, which manifests fast reaction kinetics, specifically $Na^+$ diffusion kinetics, on the electrode surface and enables excellent rate performance of BHT-BQ-COF-based electrodes.

Example 7

Fabrication of BHT-BQ-COF-Based Anode and Presodiated BHT-BQ-COF-Based Anode

BHT-BQ-COF, Ketjen Black, and polyvinylidene fluoride (PVDF) were mixed in N-methyl-2-pyrrolidone (NMP) with a mass ratio of 5:4:1. The obtained slurry was pasted onto an Al foil and dried at 80° C. for 12 h in a vacuum oven, and thereby the (pristine) BHT-BQ-COF-based anode is obtained.

The obtained (pristine) BHT-BQ-COF-based anode was combined with a Na electrode to fabricate a half cell battery. After performing a discharging process at 50 mA $g^{-1}$ for about 10 hours, the cell was disassembled in the glovebox to isolate the presodiated BHT-BQ-COF-based electrode as the anode of the full cell.

Example 8

Fabrication of the Half SIB Coin Cell with the BHT-BQ-COF-Based Anode

An o-ring was placed on a smaller cap and pressed against the case. Next, a spring, a stainless steel spacer and the (pristine) BHT-BQ-COF-based anode obtained in Example 7 were placed on the o-ring sequentially, with the cast film of the anode facing upwards. After that, a separator (glass fiber) was placed on top of the anode as centered as possible. 200 μL of 1M sodium hexafluorophosphate ($NaPF_6$) in diglyme as the electrolyte was then dropped onto the separator. Next, a sodium disc cathode was placed on top, with the cast film facing the anode and centered as much as possible with the anode to avoid uneven current densities. Finally the larger case was placed on top and the coin cell was packed with 0.8 kPa pressure.

Example 9

Electrochemical Performance of Half SIB Coin Cell with the BHT-BQ-COF-Based Anode Coin cells of CR2032, assembled in an argon-filled glovebox ($O_2$≤0.1 ppm, $H_2O$≤0.1 ppm), were used to investigate the electrochemical performance of the BHT-BQ-COF//Na half-cell SIBs.

Figure 11B:
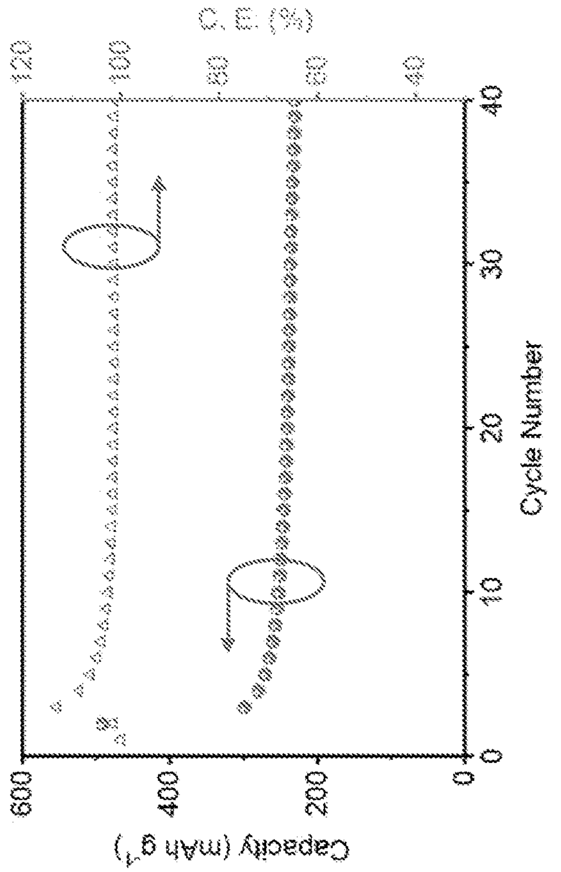
FIG. 11B is a plot showing the cycling stability of the BHT-BQ-COF-based anode in SIB at a current density of about 50 mA $g^{-1}$ in a voltage range of about 0.05 V to about 2 V.
Figure 11A:
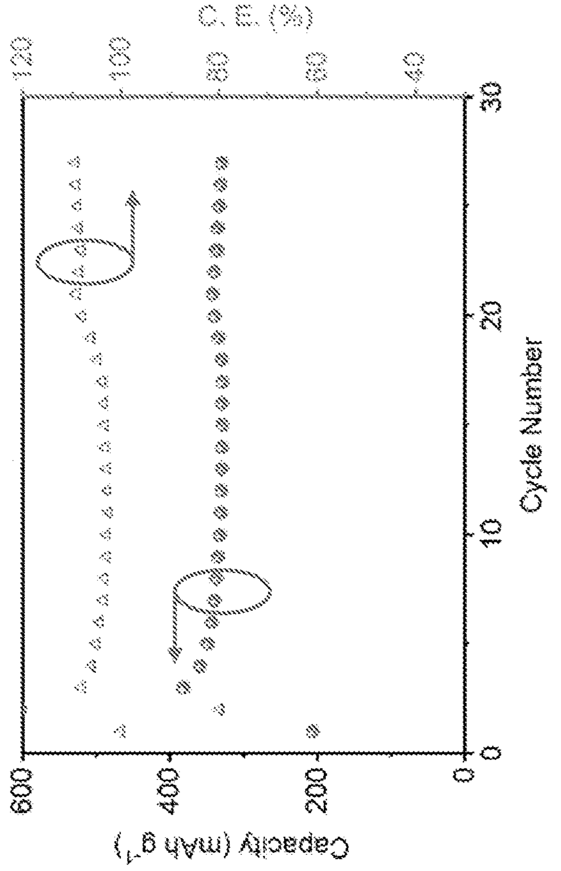
FIG. 11A is a plot showing the cycling stability of the BHT-BQ-COF-based anode in SIB at a current density of about 20 mA $g^{-1}$ in a voltage range of about 0.05 V to about 2 V.

FIGS. 10A-10B and FIGS. 11A-11B show the electrochemical performance of the BHT-BQ-COF-based anode between 0.05-2 V. It delivers high cycling stability with reversible capacities of ~340 and 270 mAh $g^{-1}$ at the current densities of 20 mA $g^{-1}$ and 50 mA $g^{-1}$, respectively (FIGS. 11A-11B). No obvious drop can be observed after 40 charging/discharging cycles illustrating excellent stability of the electrode materials.

Figure 12:
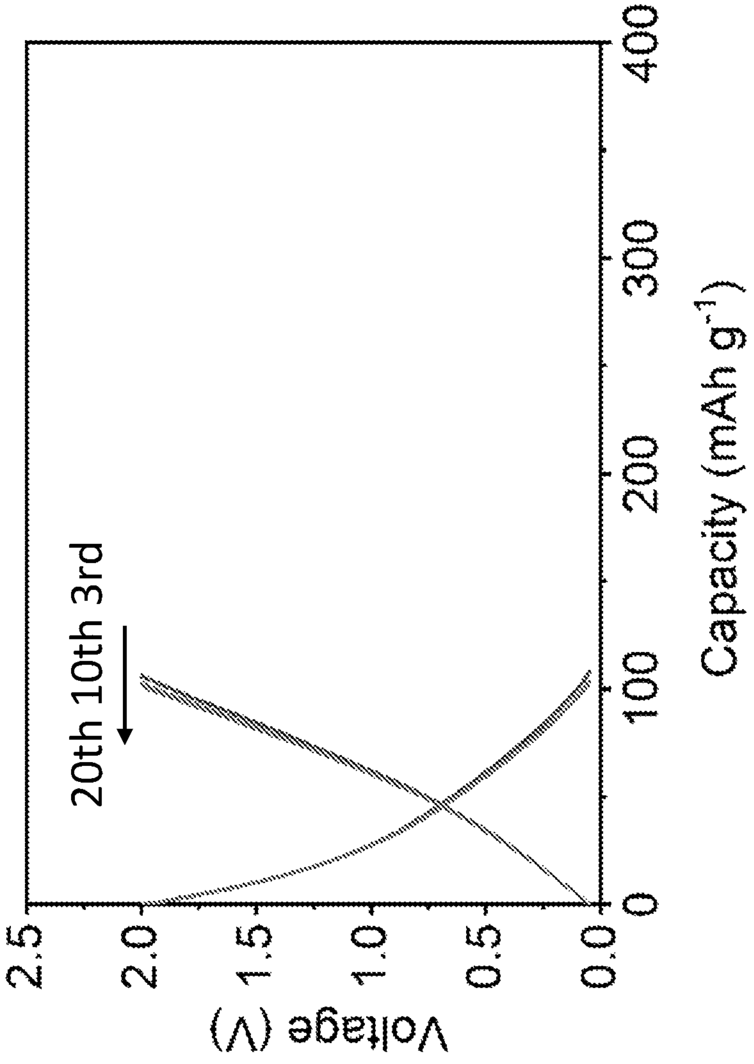
FIG. 12 is a plot showing the charge/discharge curves of a half battery of Ketjen Black//Na at a current density of about 50 mA $g^{-1}$ in a voltage range of about 0.05 V to about 2 V at different cycles. The direction of the arrow denotes the order of the $n^{th}$ cycle. From right to left, the curves are at the third, tenth and twentieth cycles, respectively.
Figure 13:
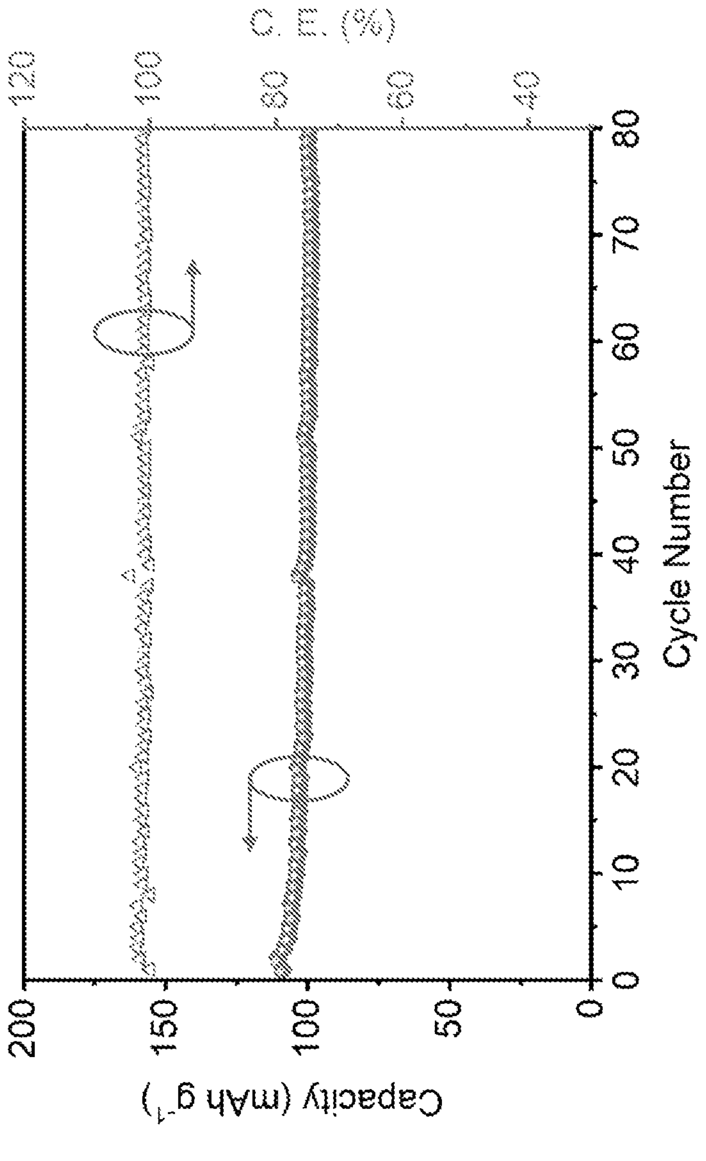
FIG. 13 is a plot showing the cycling stability of a half battery of Ketjen Black//Na at a current density of about 50 mA $g^{-1}$ in a voltage range of about 0.05 V to about 2 V.

FIGS. 12 and 13 show the sodium storage performance of Ketjen Black electrodes in SIBs with a reversible capacity of ~105 mAh $g^{-1}$ at a current density of 50 mA $g^{-1}$. It means that the absolute specific capacity of BHT-BQ-COF-based anode is about 60 mAh $g^{-1}$ at a current density of 50 mA $g^{-1}$.

Example 10

Fabrication of the Full SIB Coin Cell with the BHT-BQ-COF-Based Cathode and the Presodiated BHT-BQ-COF-Based Anode An o-ring was placed on a smaller cap and pressed against the case. Next, a spring, a stainless steel spacer and the presodiated BHT-BQ-COF-based anode obtained in Example 7 were placed on the o-ring sequentially, with the cast film of the anode facing upwards. After that, a separator (glass fiber) was placed on top of the anode as centered as possible. 200 μL of 1M sodium hexafluorophosphate ($NaPF_6$) in diglyme as the electrolyte was then dropped onto the separator. Next, the BHT-BQ-COF-based cathode obtained in Example 4 was placed on top, with the cast film facing the anode and centered as much as possible with the anode to avoid uneven current densities. Finally the larger case was placed on top and the coin cell was packed with 0.8 kPa pressure.

Example 11

Figure 14:
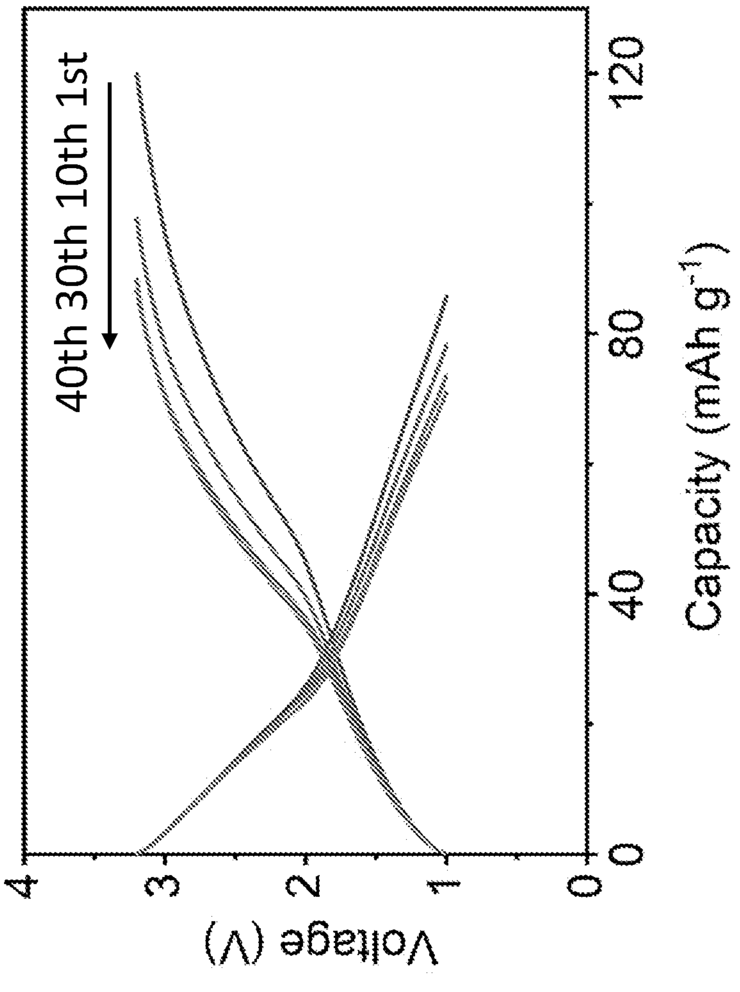
FIG. 14 is a plot showing the charge/discharge curves of a symmetric all-organic full battery at about 100 mA $g^{-1}$ in a voltage range of about 1.0 V to about 3.2 V at different cycles. The direction of the arrow denotes the order of the $n^{th}$ cycle. From right to left, curves are at the third, tenth, thirtieth and fortieth cycles, respectively.
Figure 15:
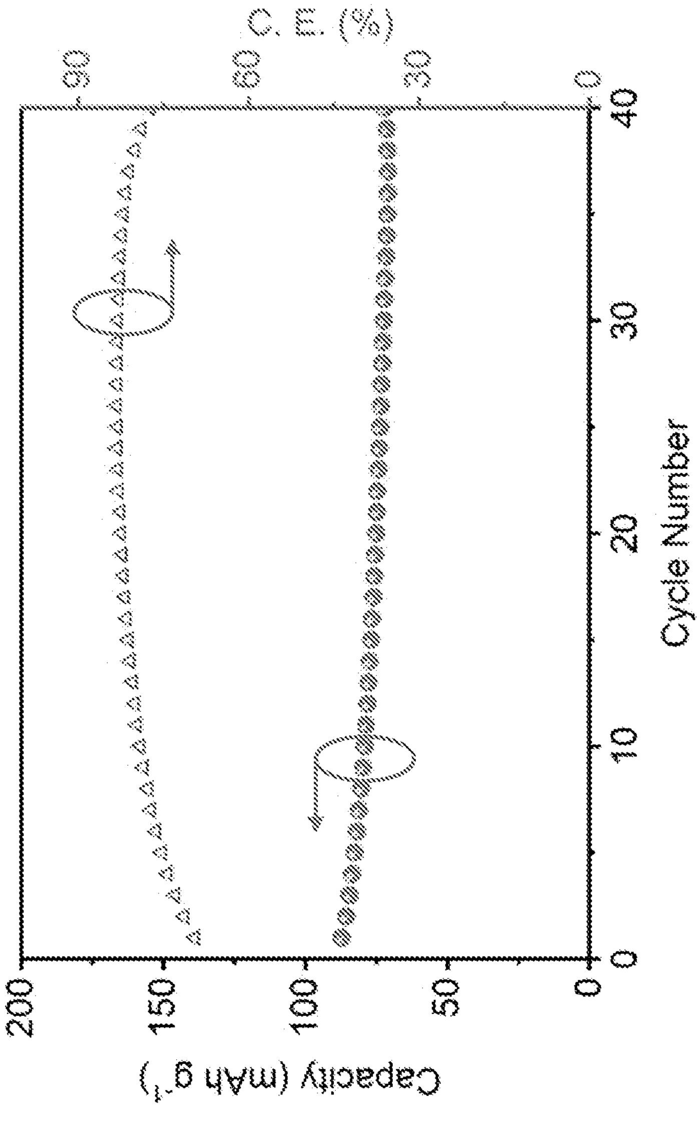
FIG. 15 is a plot showing the cycling stability of the symmetric all-organic full battery at about 100 mA $g^{-1}$ in a voltage range of about 1.0 V to about 3.2 V.

Device Performance of Symmetric Full SIB Coin Cell Utilizing BHT-BQ-COF-Based Electrode Coin cells of CR2032, assembled in an argon-filled glovebox ($O_2$≤0.1 ppm, $H_2O$≤0.1 ppm), were used to investigate the electrochemical performance of the BHT-BQ-COF//presodiated BHT-BQ-COF full-cell SIBs. The galvanostatic charge/discharge measurements were performed on a MACCOR battery cycler at current densities of 100, 200, 300, 500, 800, 1000, 1500, 2000, and 3000 mA $g^{-1}$. Electrochemical impedance spectroscopy (EIS) was obtained by applying a sine wave with an amplitude of 10 mV in the frequency range from 100 kHz to 100 mHz on Solartron 1400 electrochemical workstation. As shown in FIGS. 14 and 15, a high reversible discharge capacity of ~90 mAh $g^{-1}$ can be obtained at a current density of 100 mA $g^{-1}$. Besides, good cycling stability of SIB can be achieved, which is associated to the stable structure of BHT-BQ-COF.

Figure 16:
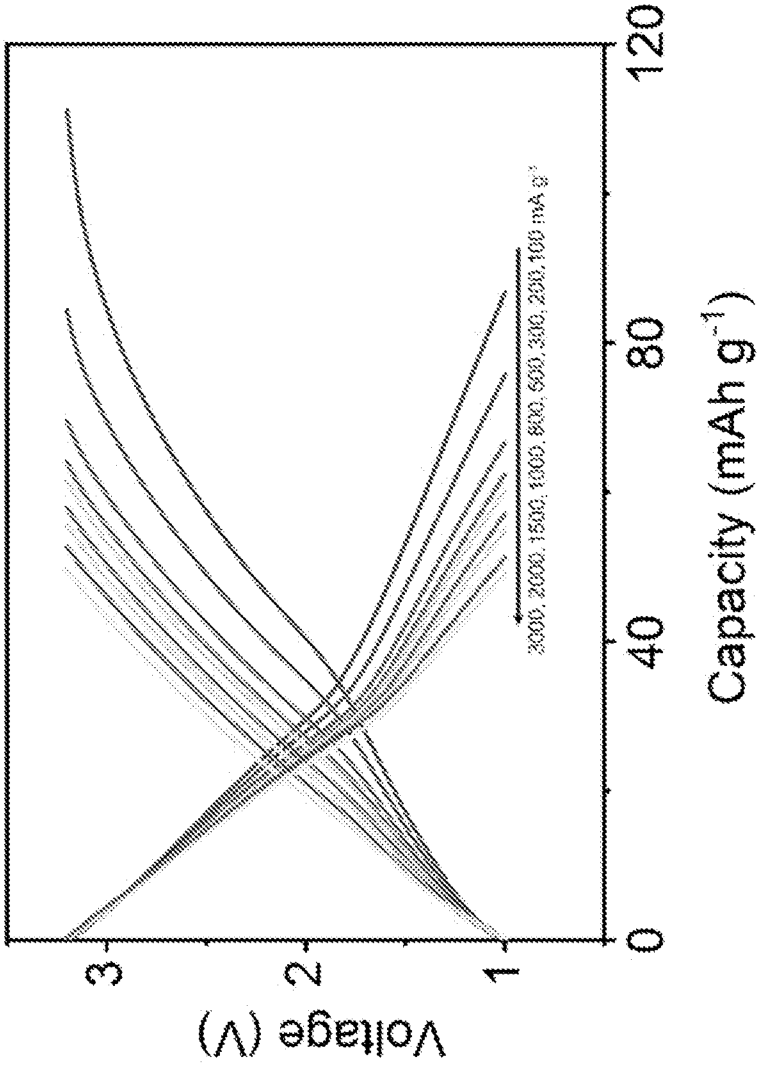
FIG. 16 is a plot showing the charge/discharge curves of the symmetric all-organic full battery at different current densities in a voltage range of about 1.0 V to about 3.2 V. The direction of the arrow denotes that, from right to left, the current densities being about 100, 200, 300, 500, 800, 1000, 1500, 2000 and 3000 mA $g^{-1}$, respectively.
Figure 17:
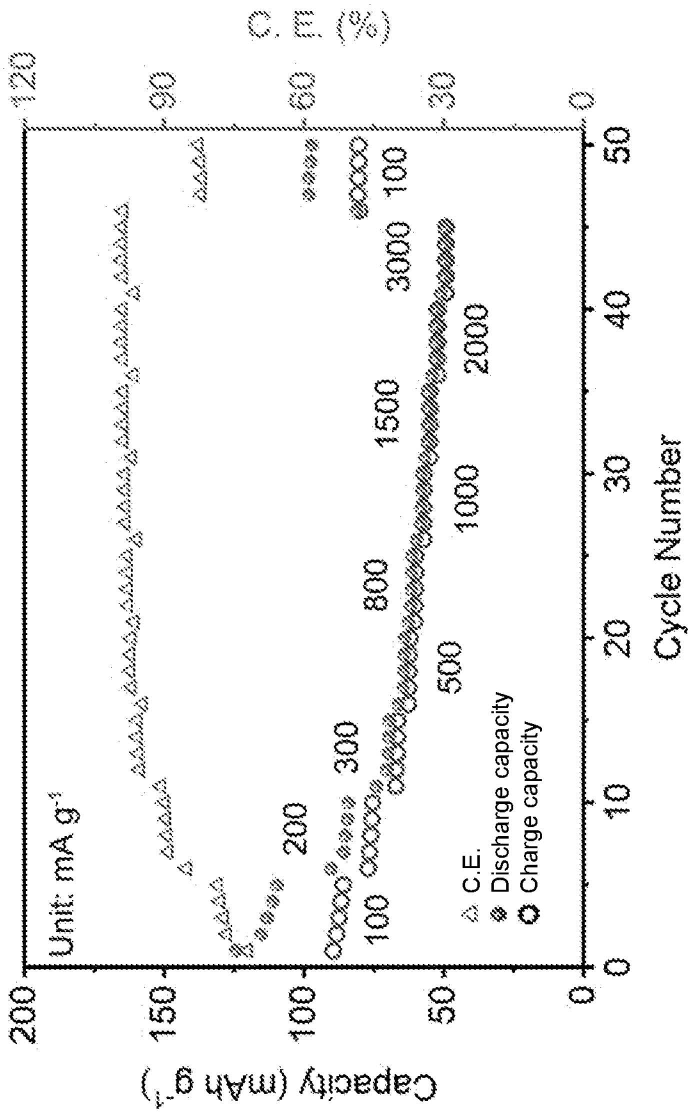
FIG. 17 is a plot showing the rate performance of the symmetric all-organic full battery in a voltage range of about 1.0 V to about 3.2 V.

FIGS. 16 and 17 display the rate performance of the symmetric (all-organic) full SIB batteries at a wide current density range of 100 to 3000 mA $g^{-1}$ between 1.0-3.2 V. It shows superior rate capability with reversible discharge capacities of 89.6, 76.9, 67.1, 62.7, 60.4, 57.2, 55.0, 52.2, and 49.2 mAh $g^{-1}$ at 100, 200, 300, 500, 800, 1000, 1500, 2000, and 3000 mA $g^{-1}$, respectively. This demonstrates fast $Na^+$ diffusion kinetics in the symmetric all-organic full battery.

Figure 18:
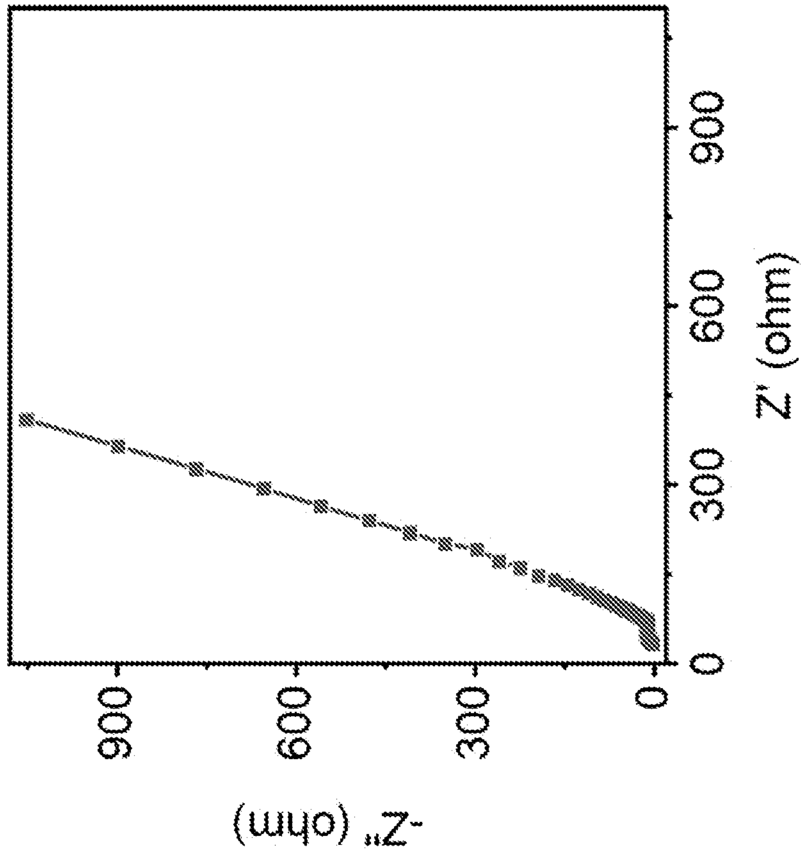
FIG. 18 is a plot showing the electrochemical impedance spectroscopy (EIS) results of the symmetric all-organic full battery.

Electrochemical impedance spectroscopy (EIS) was employed to characterize the charge carrier transfer and charge storage process. FIG. 18 shows the EIS results of the cell of the symmetric all-organic battery with a wide frequency range from 100 kHz to 100 mHz. The small $R_{ct}$ in the symmetric BHT-BQ-COF//presodiated BHT-BQ-COF full cell is about 40 ohm, which manifests fast reaction kinetics on the anode and cathode surface and enables excellent rate performance.

The above embodiments and examples provide a dithioether-linked COF with a much better stability in electrolyte than typical organic small molecules. Its porous and rigid structure, easiness of modification and insolubility allow it to be a promising organic cathode and anode material for rechargeable sodium-ion batteries, including both the asymmetric half- and symmetric full-cell sodium-ion batteries. High performance such as high capacity and excellent cyclic stability and reversibility can be simultaneously achieved when combining proper electrolyte and additives that, e.g., provide multiple redox-reactive sites. The COF also provides a large specific area that is essential for efficient ion insertion and extraction.

It will be appreciated by persons skilled in the art that numerous variations and/or modifications may be made to the invention as shown in the specific embodiments without departing from the spirit or scope of the invention as broadly described. The described embodiments of the invention should therefore be considered in all respects as illustrative, not restrictive.

The invention claimed is:

1. An electrode material for an energy storage device comprising a covalent organic framework having a plurality of tetra-halogen-substituted benzoquinone each being covalently linked by 1,2,3,4,5,6-benzenehexathiol, wherein the covalent organic framework comprises a structural representation of Formula (I):

Formula (I)

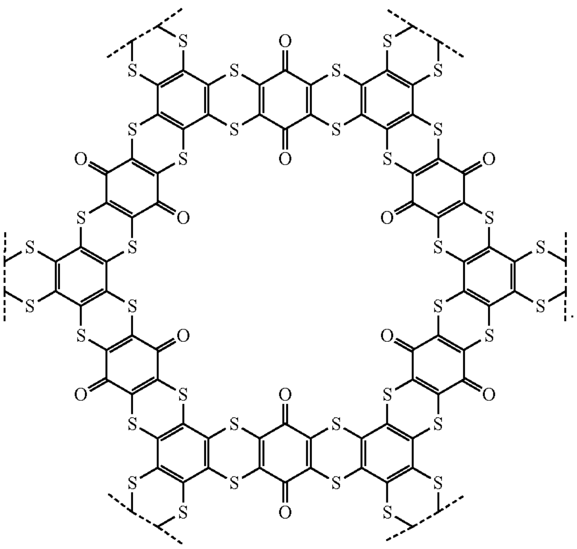

2. An anode comprising an electrode material with a covalent organic framework that includes a plurality of tetra-halogen-substituted benzoquinone each being covalently linked by 1,2,3,4,5,6-benzenehexathiol, wherein the covalent organic framework comprises a structural representation of Formula (I):

Formula (I)

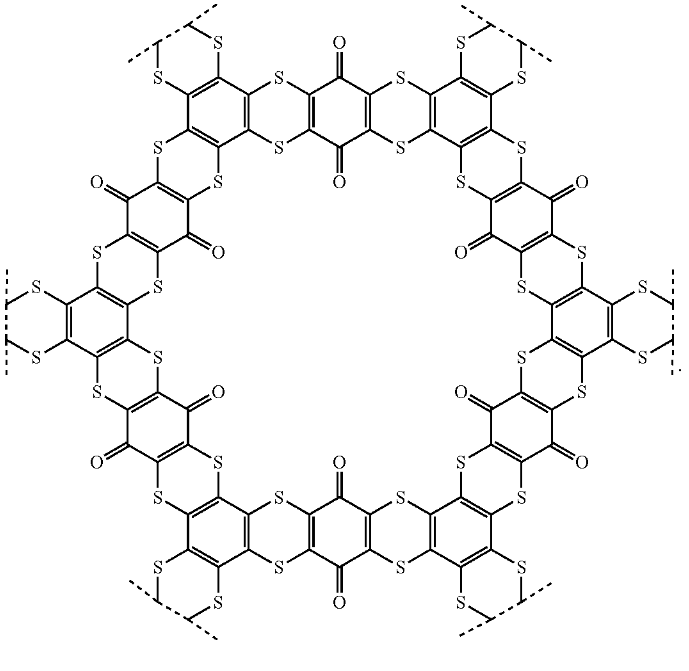

3. An energy storage device, comprising a cell having an anode, wherein the anode is formed from an electrode material with a covalent organic framework that includes a plurality of tetra-halogen-substituted benzoquinone each being covalently linked by 1,2,3,4,5,6-benzenehexathiol, wherein the covalent organic framework comprises a structural representation of Formula (I):

Formula (I)

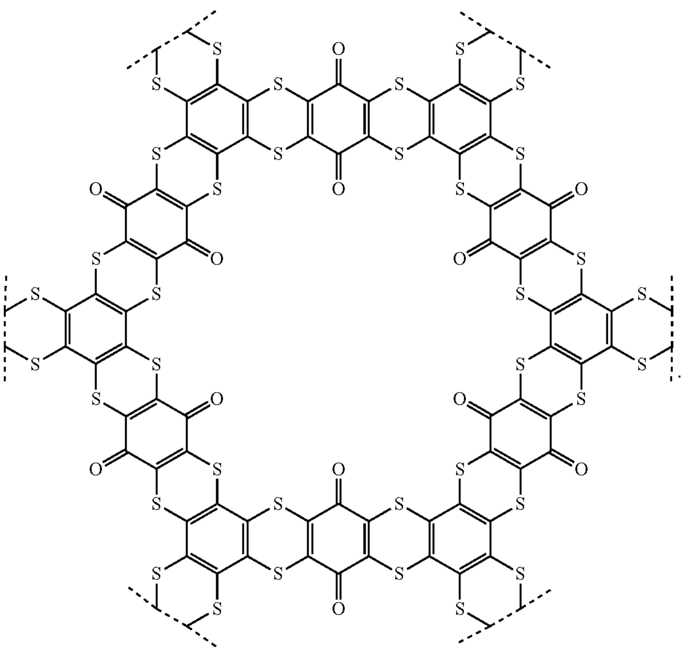

4. The energy storage device as claimed in claim 3, wherein the cell includes a cathode, wherein the cathode is formed from an electrode material with a covalent organic framework that includes a plurality of tetra-halogen-substituted benzoquinone each being covalently linked by 1,2,3,4,5,6-benzenehexathiol, wherein the covalent organic framework comprises a structural representation of Formula (I):

Formula (I)

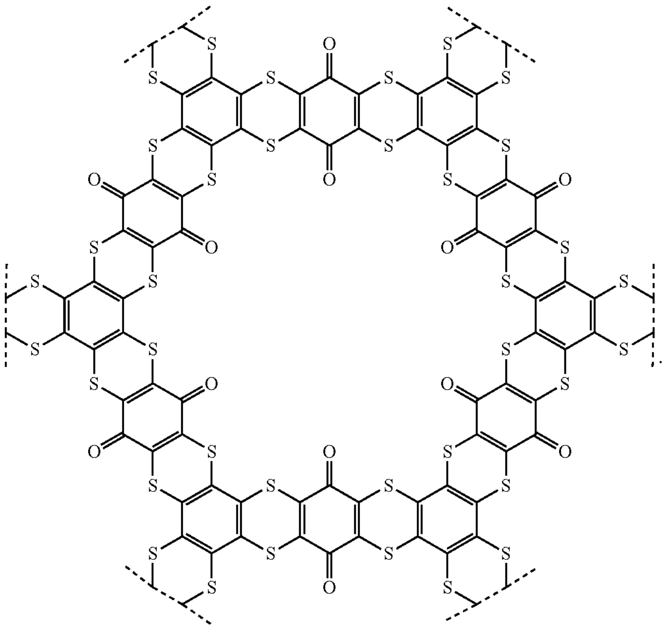

5. The energy storage device as claimed in claim 3 comprising a half coin cell.

6. The energy storage device as claimed in claim 3, comprising a full coin cell.

7. The energy storage device as claimed in claim 5, wherein the half coin cell comprises a sodium-ion battery or a lithium-ion battery.

8. The energy storage device as claimed in claim 6, wherein the full coin cell comprises a sodium-ion battery or a lithium-ion battery.

9. A method of preparing an electrode having the electrode material as claimed in claim 1, comprising the steps of:

providing a mixture of a covalent organic framework having a plurality of dithioether-linked benzoquinone moieties, a conductive material, a binder, and a solvent; and transferring the mixture onto a current collector.

10. The method as claimed in claim 9, wherein the covalent organic framework, the conductive material, and the binder has a mass ratio from about 7:2:1 to about 3:6:1.

11. The method of claim 8, wherein the electrode comprises an anode.

12. The method of claim 11, further comprising the step of presodiation of the electrode to form a presodiated anode.

13. The method of claim 12, wherein the presodiated anode is formed by way of a discharging process at about 40 mA $g^{-1}$ to about 60 mA $g^{-1}$ for about 9 to about 11 hours.

* * * * *